United States Patent
Takei et al.

(10) Patent No.: US 8,667,142 B2
(45) Date of Patent: Mar. 4, 2014

(54) COMMUNICATION TERMINAL, TERMINAL SWITCHING SYSTEM, AND TERMINAL SWITCHING METHOD

(75) Inventors: Kentaro Takei, Kanagawa (JP); Sachiko Takeshita, Tokyo (JP); Daisaku Komiya, Kanagawa (JP); Maki Amishima, Kanagawa (JP); Mingqiang Xu, Chiba (JP)

(73) Assignee: Panasonic Corporation, Osaka (JP)

( * ) Notice: Subject to any disclaimer, the term of this patent is extended or adjusted under 35 U.S.C. 154(b) by 725 days.

(21) Appl. No.: 11/814,746

(22) PCT Filed: Jan. 23, 2006

(86) PCT No.: PCT/JP2006/300934
§ 371 (c)(1),
(2), (4) Date: Jul. 25, 2007

(87) PCT Pub. No.: WO2006/080267
PCT Pub. Date: Aug. 3, 2006

(65) Prior Publication Data
US 2009/0055537 A1     Feb. 26, 2009

(30) Foreign Application Priority Data
Jan. 25, 2005 (JP) .................................. 2005-016474

(51) Int. Cl.
*G06F 15/16* (2006.01)
*G06F 15/173* (2006.01)

(52) U.S. Cl.
USPC ........................... 709/227; 709/217; 709/223

(58) Field of Classification Search
USPC .............................................. 709/227–337
See application file for complete search history.

(56) References Cited

U.S. PATENT DOCUMENTS 6,978,128 B1 *  12/2005  Raman et al. .............. 455/414.1
7,539,759 B2    5/2009   Narayanan et al.
(Continued)

FOREIGN PATENT DOCUMENTS

JP   2001-358850 A   12/2001
JP   2003-303143 A   10/2003
(Continued)

OTHER PUBLICATIONS

K. El-Khatib, N. Hadibi and Gregor V. Bochmann, "Support for Personal Service Mobility in Ubiquitous Computing Environments", School of Information Technology & Engineering, Univeristy of Ottawa, Euro-Par 2003 Parallel Processing: 9th International Euro-Par Conference Klagenfurt, Aug. 26, 2003.

(Continued)

*Primary Examiner* — Ian N Moore
*Assistant Examiner* — Jenee Alexander
(74) *Attorney, Agent, or Firm* — RatnerPrestia

(57) ABSTRACT

A transfer-source terminal, a communication-destination terminal, and a nearby terminal existing in the neighborhood of transfer-source terminal are provided. The nearby terminal collects connectivity information for monitoring connectivity after terminal switching by performing a communication process with the communication-destination terminal, and transmits the connectivity information collected to the transfer-source terminal. The transfer-source terminal receives connectivity information from the nearby terminal by a connectivity information receiving unit, determines a transfer-destination terminal from among the nearby terminals according to connectivity information by a transfer-destination terminal determinating unit, and transfers a communication session with a communication-destination terminal to the transfer-destination terminal determined, by a session transferring unit.

10 Claims, 12 Drawing Sheets

(56) References Cited

U.S. PATENT DOCUMENTS

| | | | |
|---|---|---|---|
| 2002/0142771 A1* | 10/2002 | Saifullah et al. | 455/436 |
| 2002/0168959 A1* | 11/2002 | Noguchi et al. | 455/405 |
| 2002/0198977 A1* | 12/2002 | Cho | 709/223 |
| 2003/0065711 A1* | 4/2003 | Acharya et al. | 709/203 |
| 2003/0139180 A1* | 7/2003 | McIntosh et al. | 455/426 |
| 2003/0225889 A1* | 12/2003 | Moutafov | 709/227 |
| 2004/0001467 A1* | 1/2004 | Cromer et al. | 370/338 |
| 2004/0044771 A1* | 3/2004 | Allred et al. | 709/227 |
| 2004/0054781 A1* | 3/2004 | Chen et al. | 709/227 |
| 2004/0203385 A1 | 10/2004 | Narayanan et al. | |
| 2006/0168239 A1* | 7/2006 | Gauthier | 709/227 |
| 2007/0112962 A1* | 5/2007 | Lewontin | 709/227 |
| 2007/0233877 A1* | 10/2007 | Qu et al. | 709/227 |
| 2008/0320145 A1* | 12/2008 | Rivera | 709/227 |

FOREIGN PATENT DOCUMENTS

| | | |
|---|---|---|
| JP | 2003-304251 A | 10/2003 |
| JP | 2004-159258 A | 6/2004 |
| JP | 2004-240906 A | 8/2004 |
| JP | 2007-500492 | 11/2010 |

OTHER PUBLICATIONS

International Search Report for PCT/JP2006/300934, dated Apr. 25, 2006.

* cited by examiner

FIG. 3

| | | |
|---|---|---|
| 301 | Device type | Mobile phone |
| 302 | IP address | 201.xxx.xxx.xxx |
| 303 | SIP address | alice@atlanta.com |
| 304 | Usable codec | G.711, MPEG2 |
| 305 | Switching policy | High priority to terminal with high transmission capacity |
| | | High priority to terminal with large screen size |

FIG. 4

| | | |
|---|---|---|
| 401 | Communication-destination IP address | 204.xxx.xxx.xxx |
| 402 | Communication-destination SIP address | bob@billoxi.com |
| 403 | Codec used | MPEG2 |

FIG. 5

|  |  | Device type | Digital TV |
|---|---|---|---|
| First nearby terminal | Terminal information | IP address | 203.xxx.xxx.xxx |
|  |  | Usable codec | MPEG2 |
|  |  | Resolution | 1600x1200 |
|  | Connectivity information | Network connectivity information | Ping transmission successful |
|  |  | Network transmission capacity information | RTT 30 ms<br>Effective throughput 9.1 Mbps |
|  |  | Authentication possibility information | Authentication to network server successful |
|  |  | Application connectivity information | Connection trial of SIP application successful |
| Second nearby terminal | Terminal information | Device type | PC terminal |
|  |  | IP address | 202.xxx.xxx.xxx |
|  |  | Usable codec | MPEG1, MPEG2 |
|  |  | Resolution | 1600x1200 |
|  | Connectivity information | Network connectivity information | Ping transmission successful |
|  |  | Network transmission capacity information | RTT 20 ms<br>Effective throughput 14.2 Mbps |
|  |  | Authentication possibility information | Authentication to network server successful |
|  |  | Application connectivity information | Connection trial of SIP application successful |
| ⋮ |  | ⋮ |  |

FIG. 7

| | | |
|---|---|---|
| 701 — | Device type | PC terminal |
| 702 — | IP address | 202.xxx.xxx.xxx |
| 703 — | SIP address | |
| 704 — | Usable codec | MPEG1,MPEG2 |
| 705 — | Resolution | 1600x1200 |

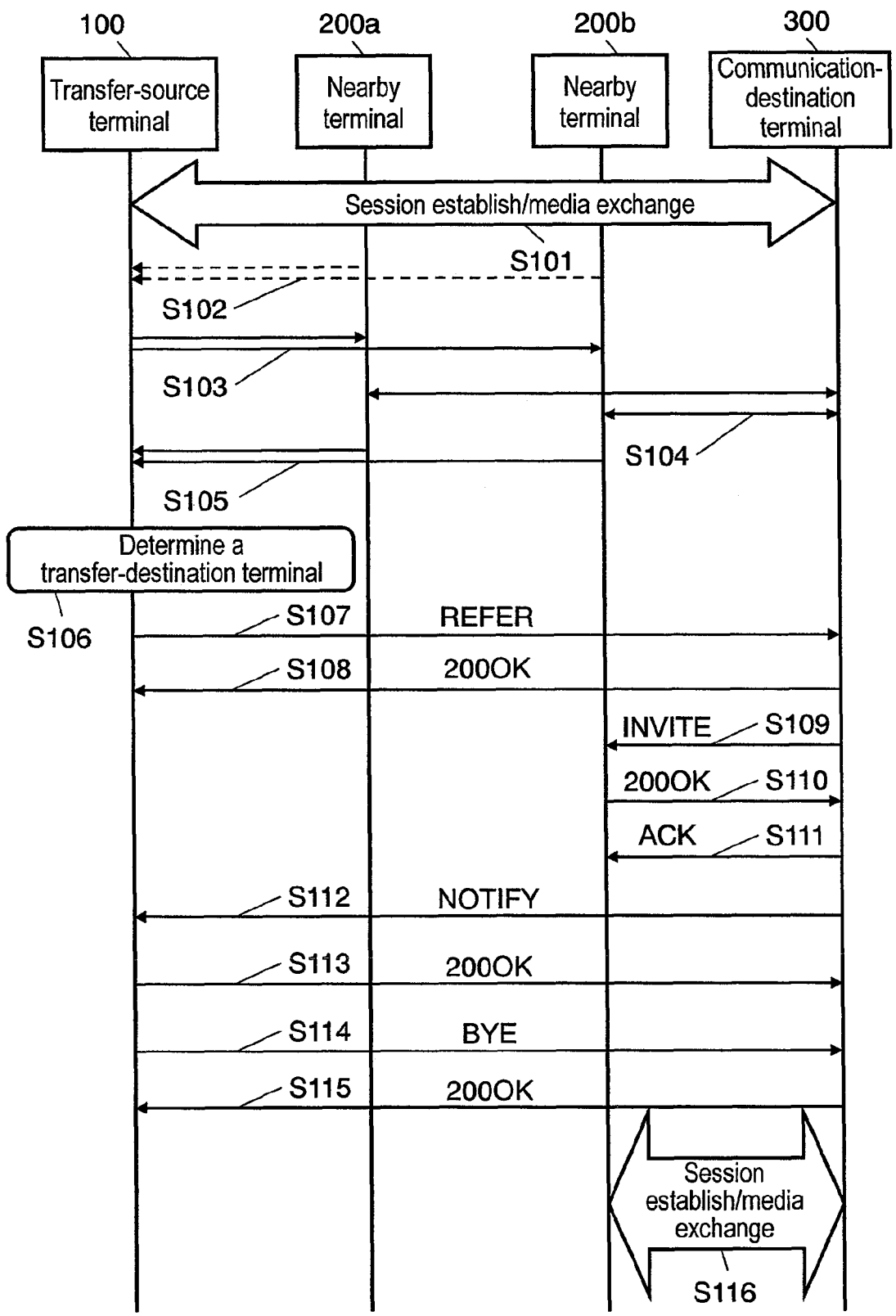

FIG. 9

| Connectivity information type | Concrete process description | Additional information |
|---|---|---|
| Network connectivity information | Ping transmission | IP address of communication-destination terminal |
| Network transmission capacity information | Effective throughput measurement | IP address of communication-destination terminal |
| | RTT measurement | IP address of communication-destination terminal |
| Authentication possibility information | Procedure of authentication to network connected | User information (e.g. account, password) |
| Application connectivity information | Trial to establish SIP session | SIP address of communication-destination terminal |

| Terminal information | Device type | | PC terminal |
|---|---|---|---|
| | IP address | | 202.xxx.xxx.xxx |
| | Usable codec | | MPEG1,MPEG2 |
| | Resolution | | 1600x1200 |
| Connectivity information | Network connectivity information | Ping transmission | Successful |
| | Network transmission capacity information | RTT measurement | 30 ms |
| | | Effective throughput measurement | 9.1 Mbps |
| | Authentication possibility information | Procedure of authentication to network connected | Successful |
| | Application connectivity information | Trial to establish SIP session | Successful |

1001 / 1002

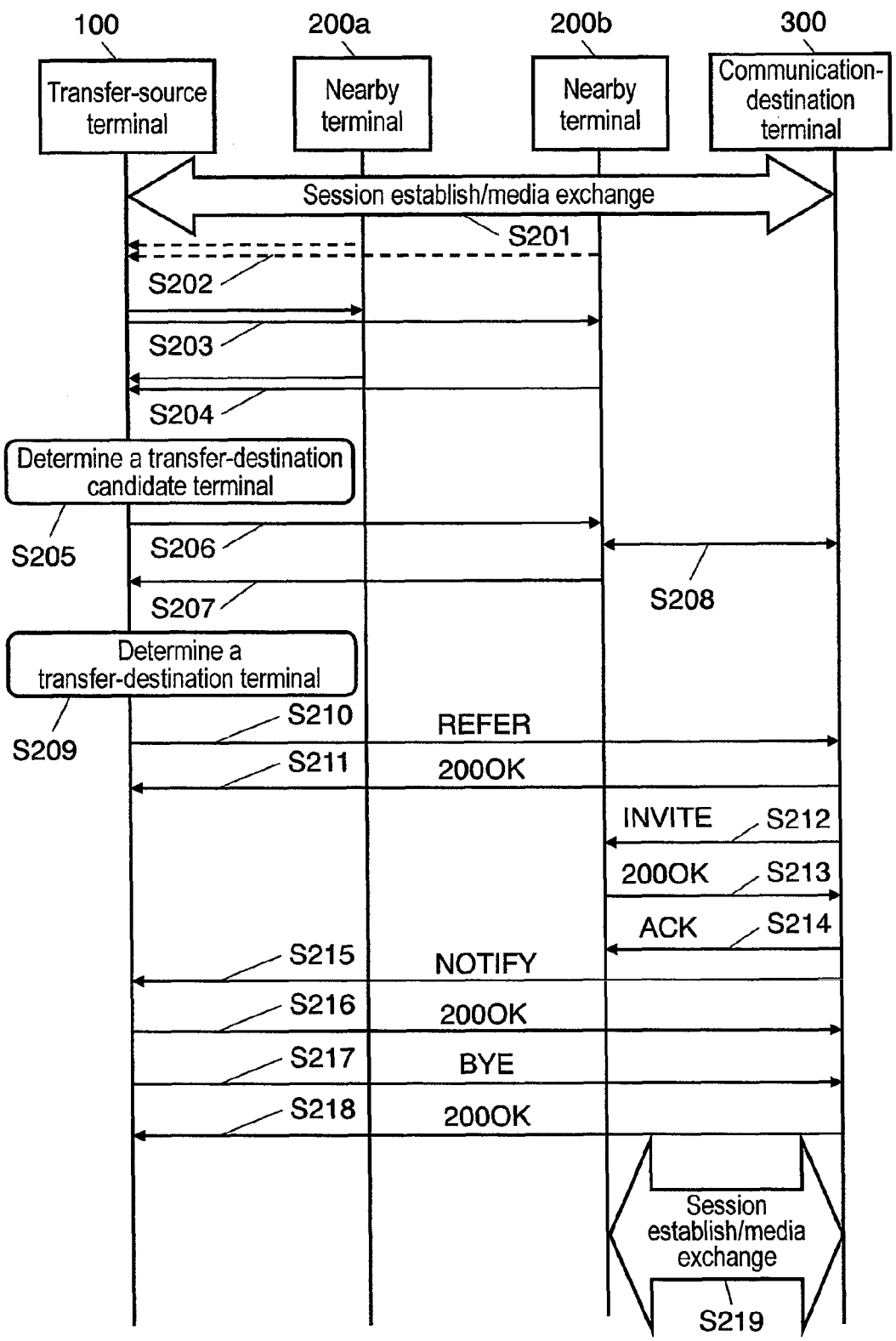

COMMUNICATION TERMINAL, TERMINAL SWITCHING SYSTEM, AND TERMINAL SWITCHING METHOD

This application is a U.S. National Phase Application of PCT International Application PCT/JP2006/300934.

TECHNICAL FIELD

The present invention relates to a terminal switching method that allows the user to switch the communication terminal without interrupting an application session during communication, and to a communication terminal and a terminal switching system for implementing the method.

BACKGROUND ART

In recent years, mobile terminals such as a mobile phone and PDA have become widely used, and thus communication services such as a telephone conversation and TV phone while the user is moving have become popular. However, a mobile terminal is reduced in size and weight for portability, and thus is often disadvantageous in functionality and operability compared to a stationary terminal such as a PC. For this reason, the user communicates using his or her own mobile terminal while moving, and desires to continue the same communication using a nearby stationary terminal while not moving.

A technique to satisfy this demand is described in Japanese Patent Unexamined Publication No. 2003-304251. FIG. 14 illustrates a conventional method for terminal switching described in the publication.

In FIG. 14, mobile terminal (PDA) 121 held by the user first detects nearby terminal (PC) 122 using short-distance wireless to automatically acquire the network address of this nearby terminal (PC) 122. Then, the mobile terminal (PDA) 121, as a transfer-source terminal, transfers the application-level communication session being performed with communication-destination terminal (PC) 300 to nearby terminal (PC) 122 as a transfer-destination terminal.

Meanwhile, another technique for terminal switching has been known conventionally. That is, a mobile terminal searches with short-distance wireless for a nearby terminal having a function for performing the same content of communication as that currently being performed by the user, from among plural nearby terminals, to determine a terminal to be a transfer destination, for terminal switching (refer to *Support for Personal and Service Mobility in Ubiquitous Computing Environments* written by K. El-Khatib and two others, Euro-Par 2003 Parallel Processing: 9th International Euro-Par Conference Klagenfurt, Austria, Aug. 26-29, 2003 Proceedings).

These techniques allow a user to use a mobile terminal while moving and to continue the communication using a stationary terminal superior in functionality and operability while staying at home or office.

However, in the above-described conventional techniques, a mobile terminal determines a transfer-destination terminal only on the basis of the information on the services and functions of a nearby terminal, acquired from the nearby terminal. Accordingly, a mobile terminal, when actually switching a terminal, may fail to connect a transfer-destination terminal to a communication-destination terminal and needs to try the process again, or may end up with connection undesirable for the user. Such problems include the following cases. That is, network-level connection between a transfer-destination terminal and communication-destination terminal fails due to security-related restrictions in the communication-destination terminal or the network; communication with the same quality as heretofore is not available due to a deficient band of the communication network between a transfer-destination terminal and a communication-destination terminal; and connection between applications fails due to different implementation in spite that a transfer-destination terminal and a communication-destination terminal have the same application-layer protocol. If such circumstances occur, a mobile terminal needs to transfer the session in search for an available transfer-destination terminal again, which is extra operation. Consequently, the user undesirably needs to wait longer until a process for switching to a transfer-destination terminal completes.

SUMMARY OF THE INVENTION

An object of the present invention is to provide a terminal switching method for switching to an appropriate terminal allowing for connectivity after terminal switching when switching the terminal used by the user during communication, and a communication terminal and a terminal switching system to be used for the method.

A communication terminal of the present invention transfers an application-level communication session performed with a communication-destination terminal through a network, to a transfer-destination terminal determined from among nearby communication terminals. A communication terminal of the present invention particularly includes: a connectivity information receiving unit that acquires information on connectivity with a nearby terminal, from the nearby terminal; a transfer-destination terminal determinating unit that determines a transfer-destination terminal from among nearby terminals according to the connectivity information; and a session transferring unit that transfers a communication session with a communication-destination terminal, to a transfer-destination terminal determined by the transfer-destination terminal determinating unit. Connectivity information is to be collected by performing a communication process with a communication-destination terminal or a server of the network, and is used for monitoring connectivity after switching from a transfer-source terminal to a transfer-destination terminal.

With such makeup, a nearby terminal acquires connectivity information for monitoring connectivity after terminal switching by performing a communication process with a communication-destination terminal, thus allowing a transfer-source communication terminal to select an appropriate transfer-destination terminal according to this connectivity information.

A terminal switching system of the present invention transfers an application-level communication session established between a communication-destination terminal as a communication destination and a transfer-source terminal as a communication source, from the transfer-source terminal to a transfer-destination terminal selected from among nearby terminals as nearby communication terminals, through a network. A nearby terminal in the terminal switching system of the present invention particularly includes: a connectivity information collecting unit that collects information on connectivity with the communication-destination terminal or a server of the network; and a connectivity information transmitting unit that transmits the connectivity information to the transfer-source terminal. The transfer-source terminal includes connectivity information receiving unit that receives connectivity information from a nearby terminal; a transfer-destination terminal determinating unit that determines a transfer-destination terminal according to the connectivity information; and a session transferring unit that transfers a communication session with the communication-destination terminal, to the transfer-destination terminal.

With such makeup, the transfer-source terminal determines a transfer-destination terminal according to connectivity information collected by a nearby terminal, thus allowing the transfer-source terminal to select an appropriate transfer-destination terminal from among nearby terminals.

The terminal switching method of the present invention transfers an application-level communication session established between a communication-destination terminal as a communication destination and a transfer-source terminal as a communication source, from the transfer-source terminal to a transfer-destination terminal selected from among nearby terminals as nearby communication terminals. Particularly in the terminal switching method of the present invention, a nearby terminal collects information on connectivity with a communication-destination terminal or a server of the network, and transmits the connectivity information to the transfer-source terminal, through a network. Then, the transfer-source terminal, when receiving the connectivity information from a nearby terminal, determines a transfer-destination terminal from among nearby terminals according to the connectivity information. After that, the transfer-source terminal transfers the communication session with the communication-destination terminal to the transfer-destination terminal.

Herewith, the transfer-source terminal determines a transfer-destination terminal according to information on connectivity with a communication-destination terminal or a server of the network, collected as a result that the nearby terminal performs a communication process, thus allowing the transfer-source terminal to select an appropriate transfer-destination terminal from among nearby terminals.

In the terminal switching method of the present invention, the nearby terminal further transmits terminal information, which is terminal-specific information related to the self, to the transfer-source terminal, and the transfer-source terminal determines a candidate transfer-destination terminal from among nearby terminals according to terminal information received from a nearby terminal. When the transfer-source terminal requests connectivity information from the transfer-destination candidate terminal, the transfer-destination candidate terminal performs a communication process with a communication-destination terminal or a server of the network, to collect connectivity information. Then, the transfer-destination candidate terminal transmits the connectivity information to the transfer-source terminal, and the transfer-source terminal determines a transfer-destination terminal from among transfer-destination candidate terminals according to connectivity information received from the transfer-destination candidate terminals.

Herewith, the transfer-source terminal limits nearby terminals from which connectivity information is acquired, according to terminal information, thus allowing the transfer-source terminal to acquire connectivity information with a small amount of network communication traffic to select a suitable transfer-destination terminal.

As described above, the present invention allows the user to switch from the communication terminal in communication to a more appropriate communication terminal, eliminates retrying a switching process, and reduces time loss, due to a connection failure after terminal switching or a connection not satisfying the user demands.

BRIEF DESCRIPTION OF DRAWINGS

FIG. 3 illustrates an example of data stored in the self terminal information of the transfer-source terminal in the terminal switching system according to the first embodiment of the present invention.

FIG. 4 illustrates an example of data stored in the session information of the transfer-source terminal in the terminal switching system according to the first embodiment of the present invention.

FIG. 5 illustrates an example of data stored in the nearby terminal information of the transfer-source terminal in the terminal switching system according to the first embodiment of the present invention.

FIG. 7 illustrates an example of data stored in the self terminal information of a nearby terminal in the terminal switching system according to the first embodiment of the present invention.

FIG. 8 illustrates an example of the processing procedure of the terminal switching system according to the first embodiment of the present invention.

FIG. 9 illustrates an example of information included in a connectivity information request in the terminal switching system according to the first embodiment of the present invention.

FIG. 10 illustrates an example of information included in a connectivity information notice in the terminal switching system according to the first embodiment of the present invention.

FIG. 11 illustrates an example of the processing procedure in the terminal switching system according to the second exemplary embodiment of the present invention.

Figure 1:
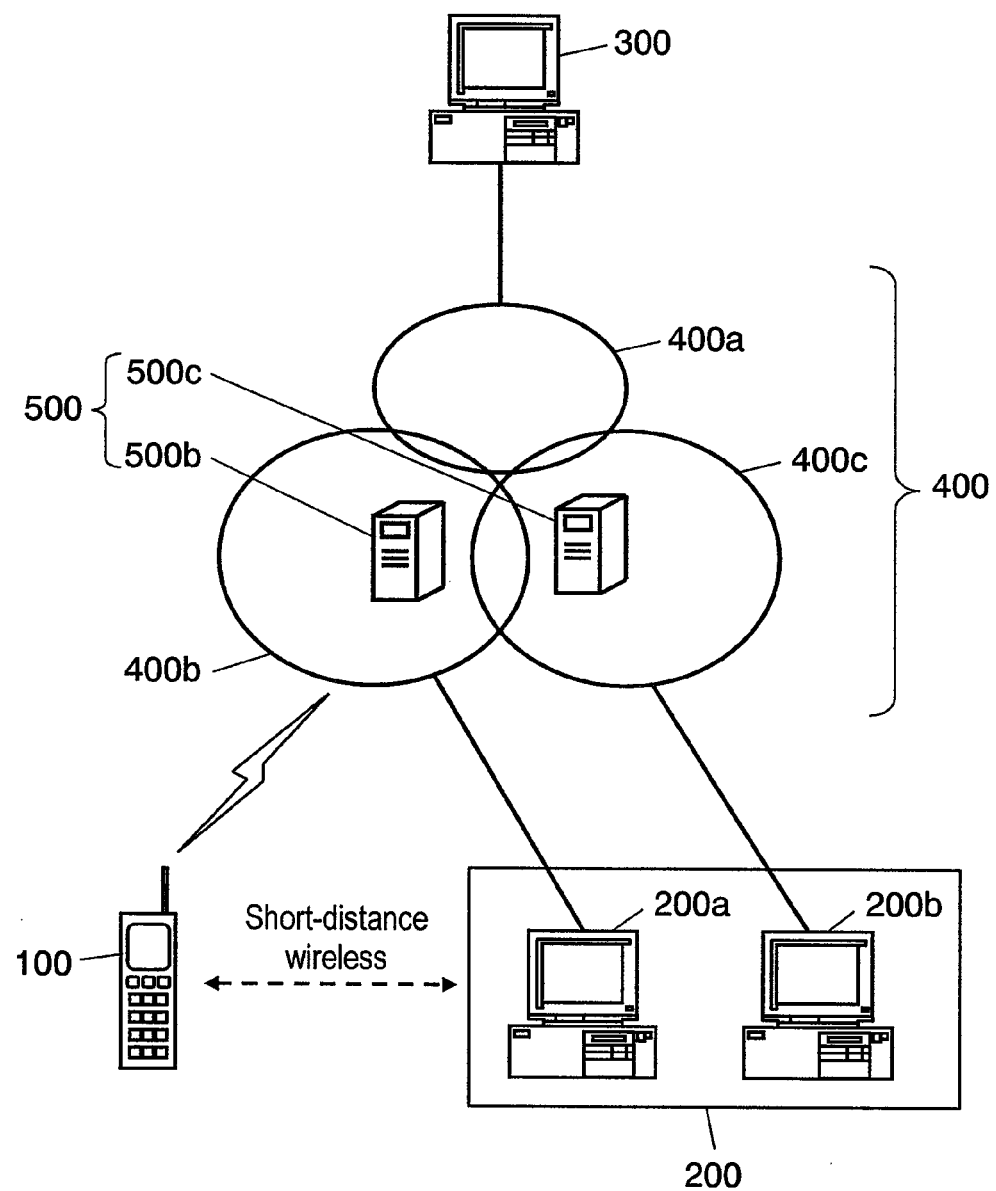
FIG. 1 illustrates the makeup of a terminal switching system according to the first exemplary embodiment of the present invention.

REFERENCE MARKS IN THE DRAWINGS 100, 121 Transfer-source terminal
101, 201 Input unit
102, 202 Output unit
103 Device control unit
104 Network sending/receiving unit
105 Short-distance wireless sending/receiving unit
106, 206, 1206, 1306 Total control unit
106a Connectivity information receiving unit
106b Transfer-destination terminal determinating unit
106c Session transferring unit
108, 208 Self terminal information
109, 209 Session information
110 Nearby terminal information
122 Nearby terminal (PC)
200, 200a, 200b Nearby terminal
203 Device control unit
204 Network sending/receiving unit
205 Short-distance wireless sending/receiving unit
206a Connectivity information collecting unit
206b Connectivity information transmitting unit 300 Communication-destination terminal
400 Network
400a First network
400b Second network
400c Third network
500, 500b, 500c Server
1206a Terminal information receiving unit
1206b Transfer-destination candidate terminal determinating unit
1306a Terminal information transmitting unit

DETAILED DESCRIPTION OF PREFERRED EMBODIMENTS

Hereinafter, a description is made for embodiments of the present invention using the related drawings.

First Exemplary Embodiment

FIG. 1 illustrates the makeup of a terminal switching system according to the first exemplary embodiment of the present invention.

As shown in FIG. 1, the terminal switching system according to the first embodiment includes transfer-source terminal 100 connected to second network 400b; communication-destination terminal 300 connected to first network 400a; and nearby terminals 200a, 200b, both positioned in the neighborhood of transfer-source terminal 100, respectively connected to second network 400b and third network 400c. Second network 400b and third network 400c have servers 500b, 500c, respectively therein, that execute procedures such as login, authentication, and billing for network users. Hereinafter, the terminal group in the neighborhood of the user is collectively referred to as nearby terminal 200. First network 400a, second network 400b, and third network 400c are collectively called network 400; server 500b and server 500c, server 500.

In the first embodiment, SIP (Session Initiation Protocol) is used for session control between transfer-source terminal 100 and communication-destination terminal 300, and between nearby terminal 200 and communication-destination terminal 300.

Figure 2:
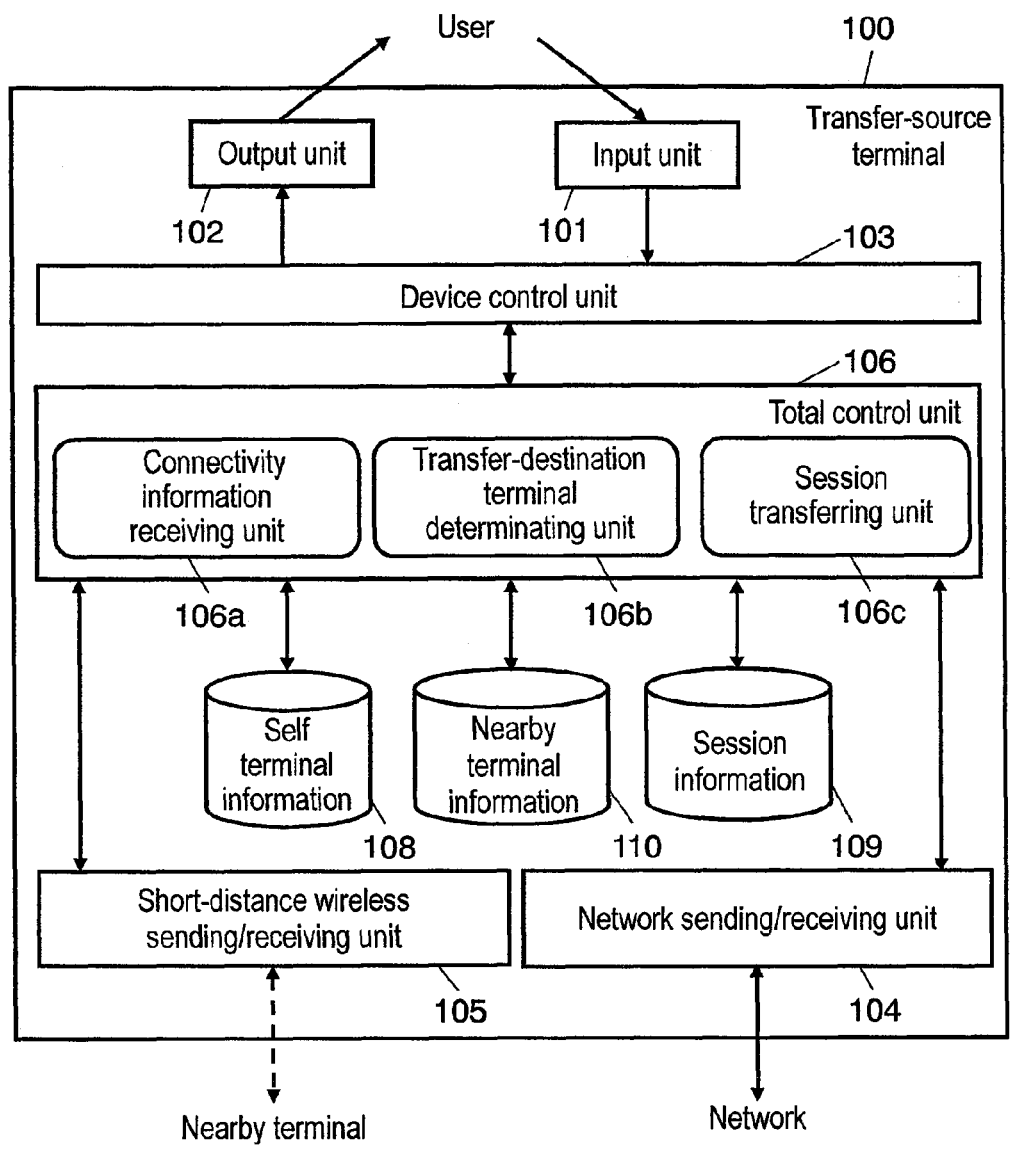
FIG. 2 illustrates the makeup of a transfer-source terminal in the terminal switching system according to the first embodiment of the present invention.

FIG. 2 illustrates the makeup of transfer-source terminal 100.

As shown in FIG. 2, transfer-source terminal 100 includes input unit 101 that accepts input from the user; output unit 102 that outputs information to the user; device control unit 103 that controls input unit 101 and output unit 102; network sending/receiving unit 104 that is used for connecting to a wireless network such as a mobile phone network or wireless LAN, or a wired LAN; short-distance wireless sending/receiving unit 105 that is used for communicating to nearby terminal 200 with short-distance wireless; total control unit 106 that controls the entire system; self terminal information 108; session information 109; and nearby terminal information 110. Transfer-source terminal 100, owing to using short-distance wireless, can communicate with nearby terminal 200 directly without network 400 intervening. Short-distance wireless may be Bluetooth (registered trademark), IrDA (Infrared Data Association), UWB (Ultra Wideband), or the like.

Input unit 101 accepts instructions from the user, and media stream such as audio and motion pictures, and is connected to device control unit 103. Input unit 101 is composed of devices for accepting user input such as a mouse and buttons, and of devices for accepting media input such as a camera and microphone.

Output unit 102 outputs information such as audio, motion pictures, and text data, and is connected to device control unit 103. Output unit 102 is composed of devices such as a display, speaker, and LEDs.

Device control unit 103 notifies total control unit 106 of information supplied from input unit 101 and makes output unit 102 output information notified to total control unit 106.

Network sending/receiving unit 104, responding to instructions from total control unit 106, sends and receives packets to and from communication-destination terminal 300 via network 400, and communicates with server 500 for authentication and billing.

Short-distance wireless sending/receiving unit 105 detects the presence of nearby terminal 200 using short-distance wireless, to notify total control unit 106, and transmits information to nearby terminal 200 using short-distance wireless, responding to instructions from total control unit 106. Further, unit 105, when receiving information from nearby terminal 200 through short-distance wireless, notifies total control unit 106 of the information. In the first embodiment, transfer-source terminal 100 transmits a request to nearby terminal 200 via short-distance wireless sending/receiving unit 105 and receives a reply to the request from nearby terminal 200.

FIG. 3 illustrates an example of data stored in self terminal information 108 of transfer-source terminal 100. Self terminal information 108 stores device type 301, IP address 302, and usable codec 304, of transfer-source terminal 100, SIP address 303 of the user using transfer-source terminal 100, and others. Information to be preliminarily set by a user may include policy 305 concerning terminal switching (referred to as "switching policy" hereinafter). As shown in FIG. 3, switching policy 305 stores a switching policy of preferentially selecting a terminal with high transmission capacity and a large screen size when switching a terminal, set by a user.

FIG. 4 illustrates an example of data stored in session information 109 of transfer-source terminal 100. Session information 109 stores information related to a session being performed by transfer-source terminal 100, namely communication-destination IP address 401 and communication-destination SIP address 402, having established a session, and usable codec 403, which is the type of a codec used to exchange media in the session.

FIG. 5 illustrates an example of data stored in nearby terminal information 110 of transfer-source terminal 100. Nearby terminal information 110 stores information related to nearby terminal 200 located in the neighborhood of transfer-source terminal 100, namely terminal information 501 of nearby terminal 200 and connectivity information 502, which is information for monitoring connectivity between nearby terminal 200 and communication-destination terminal 300. Terminal information 501 stores information such as an IP address and the type of a usable codec. Connectivity information 502 stores information such as network connectivity information 521 indicating the network-level possibility of connection between nearby terminal 200 and communication-destination terminal 300, authentication possibility information 523 indicating whether or not nearby terminal 200 can be authenticated for communication-destination terminal 300 and server 500, network transmission capacity information 522 indicating the transmission capacity of the network between nearby terminal 200 and communication-destination terminal 300, and application connectivity information 524 indicating whether or not an application of nearby terminal 200 can be connected to that of communication-destination terminal 300. As shown in FIG. 5 for example, connectivity information 502 of the first nearby terminal stores information indicating that, for the first nearby terminal, (1) ping transmission to communication-destination terminal 300 has been successful (network connectivity information 521), (2) the RTT (round trip time) with communication-destination terminal 300 is 30 ms, and the throughput is 9.1 Mbps (network transmission capacity information 522), (3) authentication by a server of the network connected has been successful (authentication possibility information 523), (4) a trial of connection by an SIP application with communication-destination terminal 300 has been successful (application connectivity information 524). All of the information is to be acquired as a result that transfer-source terminal 100 detects nearby terminal 200 by short-distance wireless sending/receiving unit 105 and communicates with nearby terminal 200, yet to be set in an initialization state of the first embodiment.

Total control unit 106 controls the entire transfer-source terminal 100. Unit 106 further includes connectivity information receiving unit 106a, transfer-destination terminal determinating unit 106b, and session transferring unit 106c. Connectivity information receiving unit 106a requests connectivity information from nearby terminal 200 detected by short-distance wireless sending/receiving unit 205 and receives connectivity information from nearby terminal 200. Transfer-destination terminal determinating unit 106b determines an appropriate transfer-destination terminal according to the connectivity information received. Session transferring unit 106c exchanges SIP messages with communication-destination terminal 300 through network sending/receiving unit 104 to transfer a session established with communication-destination terminal 300 to a transfer-destination terminal.

Next, a description is made for nearby terminal 200.

Figure 6:
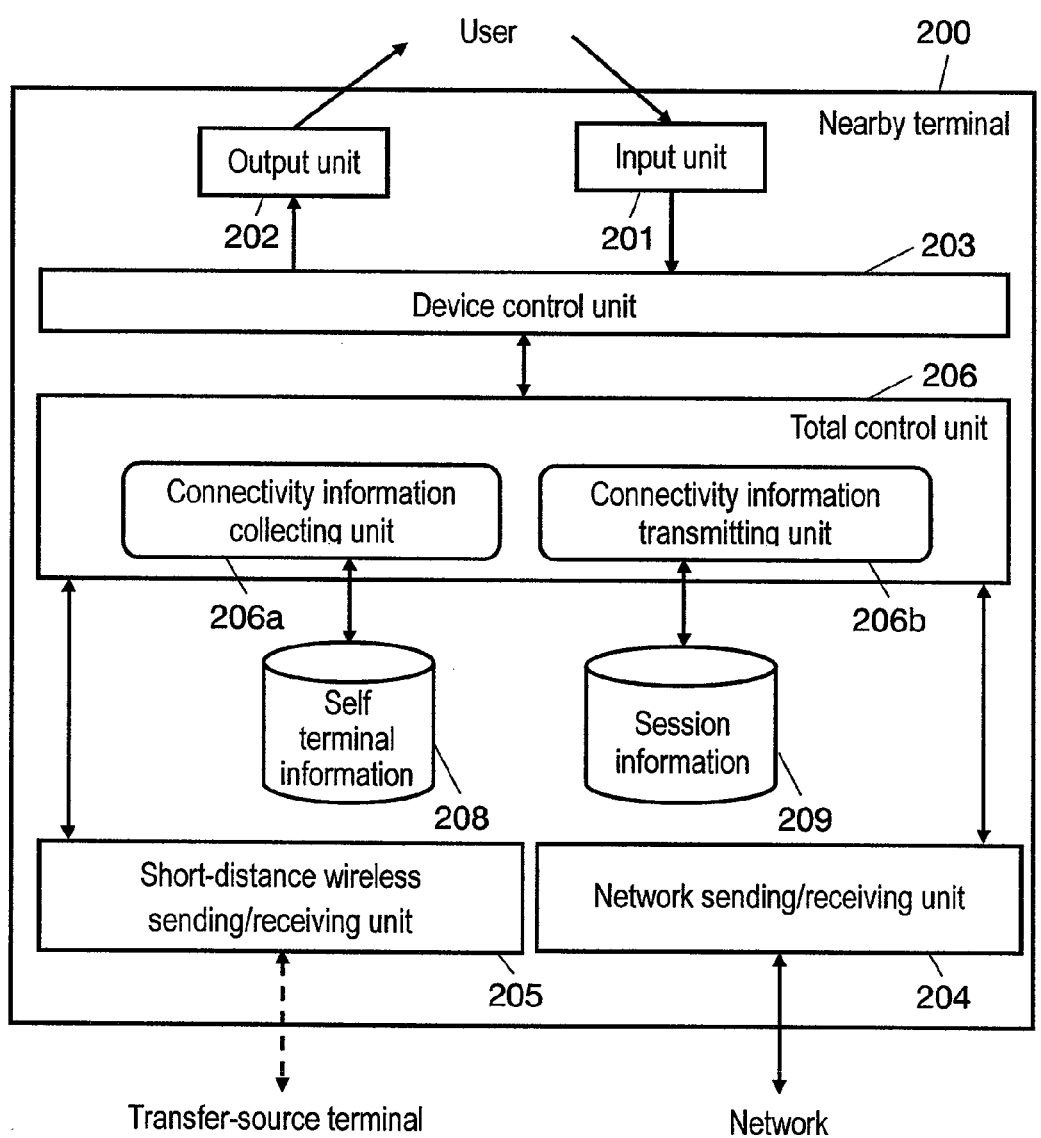
FIG. 6 illustrates the makeup of a nearby terminal in the terminal switching system according to the first embodiment of the present invention.

FIG. 6 illustrates the makeup of nearby terminal 200.

As shown in FIG. 6, nearby terminal 200 includes input unit 201 that accepts input from the user; output unit 202 that outputs information to the user; device control unit 203 that controls input unit 201 and output unit 202; network sending/receiving unit 204 that is used for connecting to a wireless network such as a mobile phone network or wireless LAN, or a wired LAN; short-distance wireless sending/receiving unit 205 that is used for communicating to transfer-source terminal 100 with short-distance wireless; total control unit 206 that controls the entire system; self terminal information 208; and session information 209. Input unit 201, output unit 202, device control unit 203, and network sending/receiving unit 204 have the same makeup as that of input unit 101, output unit 102, device control unit 103, and network sending/receiving unit 104, of transfer-source terminal 100, respectively.

Short-distance wireless sending/receiving unit 205, when receiving information from transfer-source terminal 100 through short-distance wireless, notifies total control unit 206 of the information, and transmits the information to transfer-source terminal 100 through short-distance wireless, responding to instructions from total control unit 206. In the first embodiment, a request from transfer-source terminal 100 is received and a reply to this request is transmitted through short-distance wireless sending/receiving unit 205.

FIG. 7 illustrates an example of data stored in self terminal information 208 of nearby terminal 200.

As shown in FIG. 7, self terminal information 208 stores information related the self terminal such as device type 701, IP address 702, and usable codec 704, of nearby terminal 200, SIP address 703 of the user using nearby terminal 200, and resolution 705 of the screen. In an initial state of the first embodiment, assumption is made that no user is using nearby terminal 200 and an SIP address is not set to nearby terminal 200.

Session information 209 stores information with the same configuration as that in session information 109 of transfer-source terminal 100 shown in FIG. 4. In an initial state of the first embodiment, assumption is made that nearby terminal 200 has not established a communication session with another terminal and nothing is set to each information in session information 209.

Total control unit 206 controls the entire nearby terminal 200, and further includes connectivity information collecting unit 206a and connectivity information transmitting unit 206b. Connectivity information collecting unit 206a, when transfer-source terminal 100 requests connectivity information through short-distance wireless sending/receiving unit 205, performs a communication process with communication-destination terminal 300 or server 500 through network 400, to collect connectivity information. Connectivity information transmitting unit 206b transmits connectivity information collected to transfer-source terminal 100 through short-distance wireless sending/receiving unit 205.

In the first embodiment, transfer-source terminal 100 is assumed to be a mobile terminal such as a mobile phone or PDA. Then, assumption is made that transfer-source terminal 100 establishes an SIP session with communication-destination terminal 300, and when exchanging media, the user carries transfer-source terminal 100 to teleconference with the user of communication-destination terminal 300 while exchanging motion pictures and audio.

Next, a description is made for the operation of the terminal switching system according to the first embodiment using FIG. 8.

FIG. 8 illustrates an example of the processing procedure of the terminal switching system according to the first embodiment.

As shown in FIG. 8, transfer-source terminal 100 establishes an SIP session with communication-destination terminal 300 to exchange media (step S101). When a user carrying transfer-source terminal 100 moves to the neighborhood of a terminal such as a PC or display in an office or home, short-distance wireless sending/receiving unit 105 of transfer-source terminal 100 detects one or more nearby terminals 200 and notifies total control unit 106 (step S102) of the presence.

Total control unit 106 requests connectivity information from nearby terminal 200 through short-distance wireless sending/receiving unit 105 in order to acquire information (connectivity information) for monitoring connectivity after switching when switching the session between the self and communication-destination terminal 300 to that between nearby terminal 200 and communication-destination terminal 300 (step S103).

A connectivity information request may include only the type of connectivity information requested by transfer-source terminal 100, or more concrete process descriptions for acquiring each connectivity information may be specified. Further, additional information required for nearby terminal 200 to collect each connectivity information is appended to the connectivity information request as required, such as the IP address and SIP address of communication-destination terminal 300, or user's account information (e.g. user name, password).

FIG. 9 illustrates an example of information included in a connectivity information request.

As shown in FIG. 9, this information includes connectivity information type 901 and concrete process description 902 requested by transfer-source terminal 100, and additional information 903 required for acquiring each connectivity information.

Total control unit 206 of nearby terminal 200, when receiving a connectivity information request from transfer-source terminal 100 through short-distance wireless sending/receiving unit 205, performs a communication process with communication-destination terminal 300 or server 500 through network 400, in order for connectivity information collecting unit 206a to collect connectivity information requested (step S104). If receiving a connectivity information request as shown in FIG. 9, for example, from transfer-source terminal 100, nearby terminal 200 performs the following processes (1) through (4).

(1) Nearby terminal 200 performs ping transmission to the IP address of communication-destination terminal 300 and acquires information on its success or failure as network connectivity information. (2) Nearby terminal 200 sends/receives dummy packets to/from communication terminal 300 to measure an effective throughput and RTT, and then acquires its result as network transmission capacity information. (3) Nearby terminal 200 uses user's account information such as a user name and password to perform login/authentication processes to server 500 of network 400 that the self connects to, and then acquires information on its success or failure as authentication possibility information. (4) Nearby terminal 200 uses the SIP address of communication-destination terminal 300 to perform a trial of establishing an SIP session with communication-destination terminal 300. Herewith, nearby terminal 200 checks the connectivity of an SIP application and acquires information on its success or failure as application connectivity information.

When nearby terminal 200 completes collecting connectivity information requested by transfer-source terminal 100 through the above-described process, total control unit 206 of nearby terminal 200 generates a connectivity information notice by appending self terminal information acquired from self terminal information 208 to the connectivity information. Then, connectivity information transmitting unit 206b transmits the connectivity information notice to transfer-source terminal 100 through short-distance wireless sending/receiving unit 205 (step S105). Here, an example of information included in a connectivity information notice is shown in FIG. 10.

FIG. 10 illustrates an example of information included in a connectivity information notice in the terminal switching system according to the embodiment.

In FIG. 10, terminal information 1001 has device type "PC terminal", usable codec "MPEG1, MPEG2", resolution "1600×1200", and IP address "202.xxx.xxx.xxx", appended thereto. Connectivity information 1002 indicates the following: (1) ping transmission to communication-destination terminal 300 has been successful (network connectivity information), (2) the RTT with communication-destination terminal 300 is 30 ms, and the effective throughput is 9.1 Mbps (network transmission capacity information), (3) authentication to the server of the network connected has been successful (authentication possibility information), and (4) a trial of connection by an SIP application with communication-destination terminal 300 has been successful (application connectivity information).

Next, connectivity information receiving unit 106a of transfer-source terminal 100 receives a connectivity information notice from nearby terminal 200 through short-distance wireless sending/receiving unit 105 and stores connectivity information 1002 and terminal information 1001 included in the connectivity reception notice, in nearby terminal information 110. Here, total control unit 106 may delete connectivity information 1002 and terminal information 1001 stored when detecting that each nearby terminal 200 has moved out of the range of short-distance wireless, through short-distance wireless sending/receiving unit 105, or may delete them after a certain period of time. Alternatively, total control unit 106 may retain them until the user deletes them explicitly.

When transfer-source terminal 100 receives connectivity information notices from all nearby terminals 200 through the above-described process, or the connectivity information notice waiting time timeouts, transfer-destination terminal determinating unit 106b of transfer-source terminal 100 determines a transfer-destination terminal from among nearby terminals 200 (step S106). This determination is made according to the capacity information and connectivity information stored in the nearby terminal information, of each nearby terminal 200, and according to instructions and preference of the user.

For example, transfer-destination terminal determinating unit 106b excludes nearby terminals 200 that cannot ensure connectivity after terminal switching judging by network connectivity information 521, application connectivity information 524, and authentication possibility information 523 of nearby terminal information 110, and that cannot continue media exchange being performed between transfer-source terminal 100 and communication-destination terminal 300 judging by usable codec 511 of nearby terminal information 110. Then, total control unit 106 judges that the current session can be transferred to the other nearby terminals 200 and presents its list to the user through output unit 102.

For example, if transfer-source terminal 100 has established a session with the session information shown in FIG. 4, nearby terminals 200 that do not support MPEG2, which is a codec used in the current session, are excluded, and the list of the other ones, as being transferable, is presented to the user. Then, the user can determine a transfer-destination terminal by selecting one from the list through input unit 101. Herewith, a transfer-destination terminal is not determined until the user selects one.

Meanwhile, when a new nearby terminal 200 is detected by short-distance wireless sending/receiving unit 105 before the user selects a transfer-destination terminal, nearby terminal information is acquired from the nearby terminal. Then, total control unit 106 of transfer-source terminal 100 checks whether or not connectivity after terminal switching is ensured according to connectivity information acquired. Total control unit 106, if judging that connectivity is ensured and additionally the current communication can be continued according to the terminal information, adds the new nearby terminal to the list that the user selects from. Conversely, if short-distance wireless sending/receiving unit 105 detects that certain nearby terminal 200 has moved out of the range of short-distance wireless, total control unit 106 excludes the corresponding terminal from the list.

Alternatively, transfer-destination terminal determinating unit 106b can determine a transfer-destination terminal automatically according to a switching policy preliminarily set by the user, without waiting for user's selection. If the user has set switching policy 305 as shown in FIG. 3, for example, transfer-destination terminal determinating unit 106b can automatically determine a terminal with high transmission capacity or a large screen size, as a transfer-destination terminal. Moreover, if switching policy 305 is to select a terminal with high network transmission capacity in the connectivity information, or information related to the network type or billing has been acquired, a terminal can be automatically selected that can be used for more inexpensive charge or that is connected to a network with a high level of security. Besides, other connectivity information or terminal information can be set as a switching policy.

Next, when a transfer-destination terminal is determined, session transferring unit 106c of transfer-source terminal 100 exchanges messages by SIP and transfers a communication session established with communication-destination terminal 300 to the transfer-destination terminal, for terminal switching. In the first embodiment, a description hereafter is made assuming that nearby terminal 200b has been determined as a transfer-destination terminal.

Transfer-source terminal 100 performs the procedure for SIP transfer (REFER) and requests a session transfer to nearby terminal 200b from communication-destination terminal 300 (step S107, step S108). Communication-destination terminal 300 that has received this request performs the procedure for SIP connection (INVITE) to establish a session (steps S109, S110, S111). After this connection (INVITE) procedure completes, nearby terminal 200b sets information on the session established and starts media exchange with communication-destination terminal 300.

Next, communication-destination terminal 300 performs the procedure for SIP notice (NOTIFY) to notify transfer-source terminal 100 of the success of the connection (INVITE) procedure with nearby terminal 200b (steps S112, S113).

Finally, transfer-source terminal 100 performs the procedure for SIP disconnection (BYE) to disconnect the session with communication-destination terminal 300 and stops media exchange. Then, transfer-source terminal 100 deletes the content of session information 109 (steps S114, S115).

With these processes, session transferring unit 106c of transfer-source terminal 100 transfers the session established between transfer-source terminal 100 and communication-destination terminal 300, to the transfer-destination terminal determined by transfer-destination terminal determinating unit 106b, to implement terminal switching. After that, nearby terminal 200b as a transfer-destination terminal establishes a session with communication-destination terminal 300 to start media exchange (step S116).

As described above, in the terminal switching system according to the first embodiment, transfer-source terminal 100 searches for nearby terminal 200 using short-distance wireless and acquires connectivity information for monitoring connectivity after terminal switching to implement switching to an appropriate terminal. This eliminates a failure of connection after terminal switching and an undesirable connection for the user, thus reducing the trouble of retrying a terminal switching process and processing time.

Transfer-source terminal 100 may specify a terminal type and required functions in a connectivity information request issued for nearby terminal 200. In this case, if nearby terminal 200 has a terminal type different from that specified by the connectivity information request, or if nearby terminal 200 does not have a required function specified by the connectivity information request, the process is discontinued and the request is discarded. When the connectivity information request specifies a codec such as MPEG2 as a required function, for example, nearby terminal 200 that has received this request, if not supporting the specified codec, quits a process for the connectivity information request.

Herewith, transfer-source terminal 100 can acquire required information only from a nearby terminal, thus reducing the load of a terminal switching process performed by the transfer-source terminal.

In this embodiment, an SIP REFER procedure is used to switch the subjects of session establishment and media exchange from transfer-source terminal 100 to a transfer-destination terminal. However, only the subject of media exchange may be switched to a transfer-destination terminal. This operation can be implemented, for example, by executing an SIP Re-INVITE procedure for switching only the subject of media exchange to a transfer-destination terminal. Such a process enables only media exchange to be performed between a transfer-destination terminal and a communication-destination terminal while the SIP session remains established between transfer-source terminal 100 and communication-destination terminal 300.

Moreover in this embodiment, transfer-source terminal 100, nearby terminal 200, and communication-destination terminal 300 are connected through plural networks. However, a terminal switching operation can be performed in the same way even if all the terminals are connected to the same network.

In this embodiment, the description is made for an example where terminal switching is performed in a videoconference as user communication. However, the same process applies to other user communication such as voice communication and data distribution.

Second Exemplary Embodiment

Next, a description is made for a terminal switching system according to the second exemplary embodiment of the present invention.

The terminal switching method according to the second embodiment is different from the first embodiment in that transfer-source terminal 100 determines a transfer-destination candidate terminal according to terminal information acquired by searching for nearby terminals 200 using short-distance wireless and requests connectivity information after terminal switching only from the transfer-destination candidate terminal.

Figure 12:
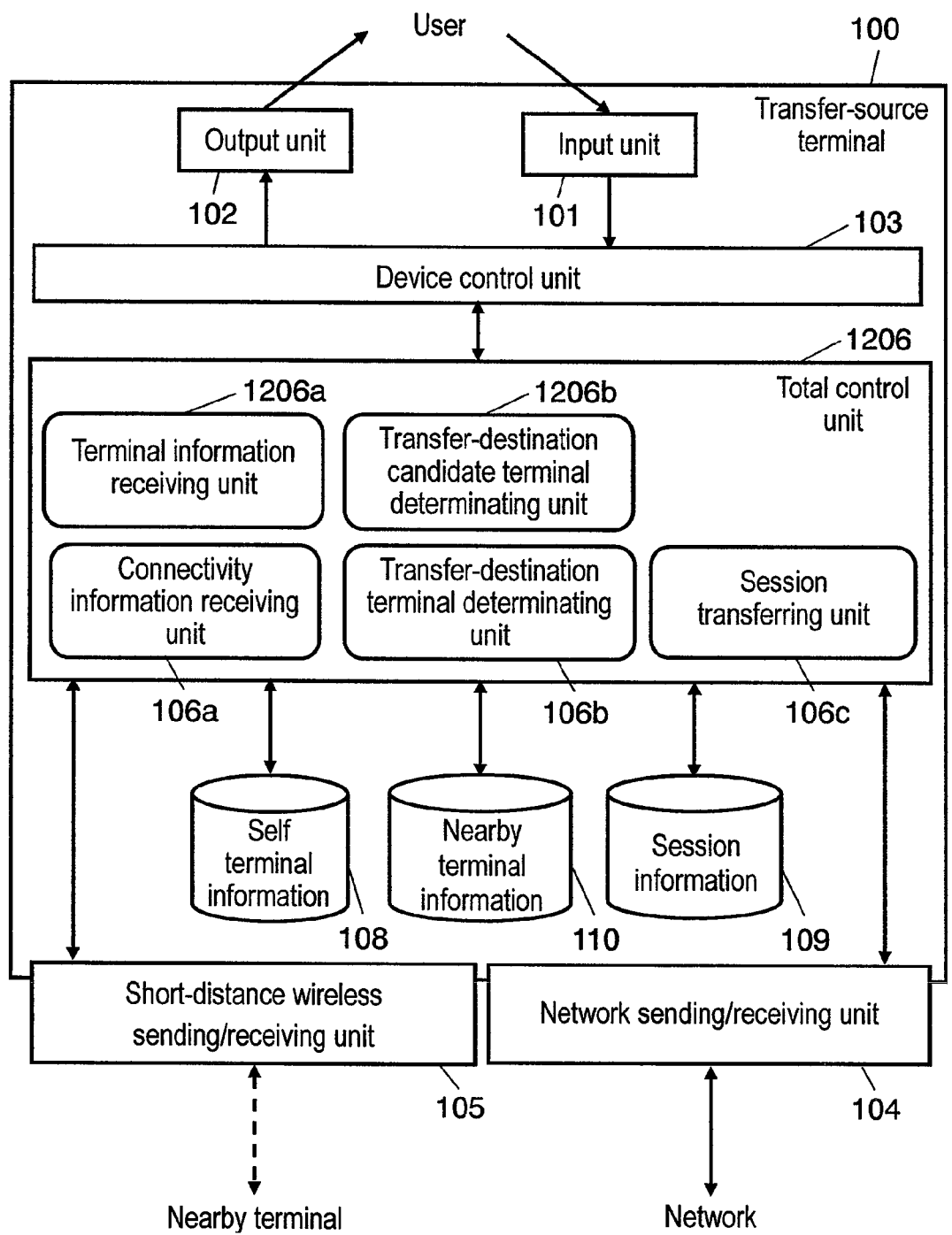
FIG. 12 illustrates the makeup of a transfer-source terminal in the terminal switching system according to the second embodiment of the present invention.

FIG. 12 illustrates the makeup of a transfer-source terminal in the terminal switching system according to the second embodiment.

In FIG. 12, the makeup is different from that of the first embodiment in that total control unit 1206 has terminal information receiving unit 1206a and transfer-destination candidate terminal determinating unit 1206b.

Terminal information receiving unit 1206a receives terminal information from nearby terminal 200. Transfer-destination candidate terminal determinating unit 1206b determines a transfer-destination candidate terminal that is judged as being able to continue the current communication according to terminal information of each nearby terminal 200.

Figure 13:
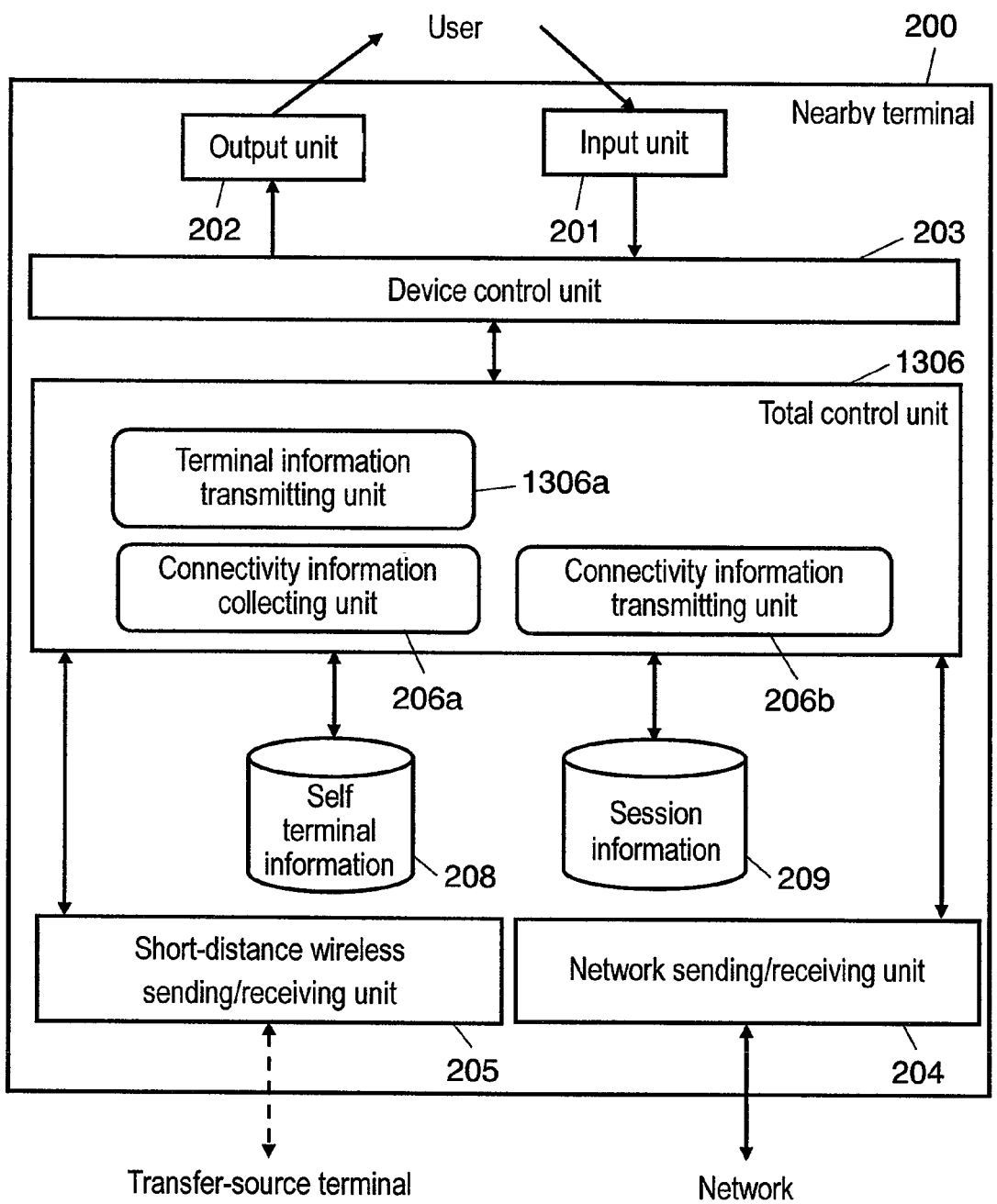
FIG. 13 illustrates the makeup of a nearby terminal in the terminal switching system according to the second embodiment of the present invention.
Figure 14:
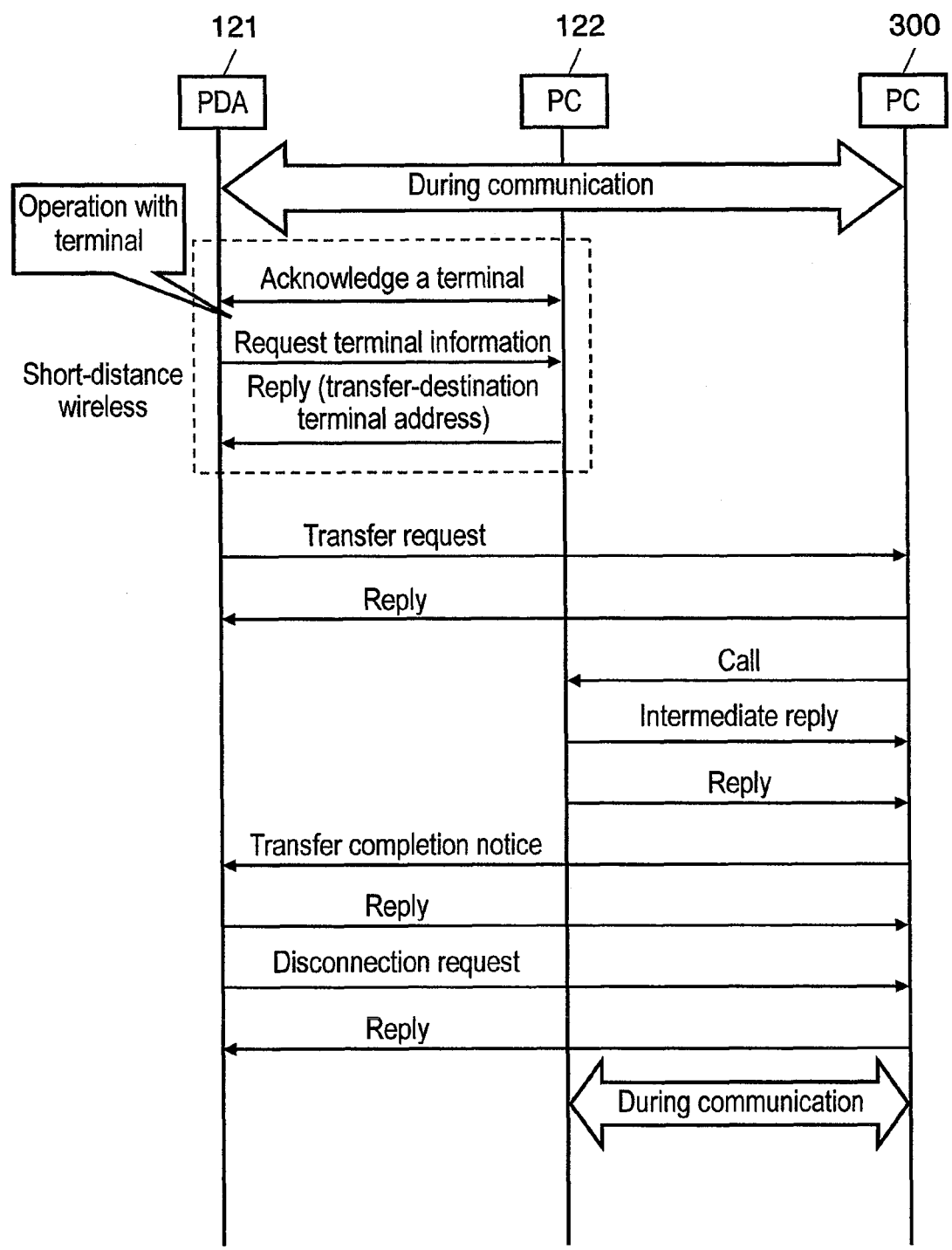
FIG. 14 illustrates a processing procedure of a conventional terminal switching system.

FIG. 13 illustrates the makeup of a nearby terminal in the terminal switching system according to the second embodiment.

In FIG. 13, the makeup is different from that of the first embodiment in that total control unit 1306 has terminal information transmitting unit 1306a.

Terminal information transmitting unit 1306a transmits a terminal information request notice with information acquired from self terminal information 208 appended thereto, to transfer-source terminal 100.

A description is made for the operation of the terminal switching system according to the second embodiment, where the system has a transfer-source terminal and a nearby terminal with the above-described makeup, using FIG. 11.

As shown in FIG. 11, transfer-source terminal 100 establishes an SIP session with communication-destination terminal 300 in the same way as in the first embodiment to perform media exchange (step S201). When a user carrying transfer-source terminal 100 moves to the neighborhood of a terminal such as a PC or display in an office or home, short-distance wireless sending/receiving unit 105 of transfer-source terminal 100 detects the terminal and notifies total control unit 1206 of the presence (step S202).

Total control unit 1206, having received the notice, transmits a terminal information request that requests terminal information related to an IP address, capabilities, and functions, from nearby terminal 200 detected, through short-distance wireless sending/receiving unit 105 (step S203).

When total control unit 1306 of nearby terminal 200 receives a terminal information request from transfer-source terminal 100 through short-distance wireless sending/receiving unit 205, terminal information transmitting unit 1306a transmits a terminal information request notice with information acquired from self terminal information 208 appended thereto, to transfer-source terminal 100 through short-distance wireless sending/receiving unit 205 (step S204). For nearby terminal 200 having self terminal information 208 with the content shown in FIG. 7, the information indicating usable codec "MPEG1, MPEG2", resolution "1600×1200", IP address "202.xxx.xxx.xxx" is acquired from self terminal information 208, and appended to the terminal information notice.

Terminal information receiving unit 1206a of transfer-source terminal 100, when receiving a terminal information notice from nearby terminal 200 through short-distance wireless sending/receiving unit 105, stores terminal information included in the terminal information notice, in nearby terminal information 110.

When transfer-source terminal 100 receives terminal information notices from all nearby terminals 200, or terminal information notice waiting time from nearby terminal 200 timeouts, transfer-destination candidate terminal determinating unit 1206b of transfer-source terminal 100 determines a transfer-destination candidate terminal that is judged as being able to continue the current communication according to terminal information of each nearby terminal 200 (step S205). For example, transfer-destination candidate terminal determinating unit 1206b can exclude nearby terminal 200 that does not support the media or codec used for media exchange in the current communication, from transfer-destination candidate terminals. Unit 1206b can also exclude a terminal that has a screen size smaller than a certain size or that is connected to a pay network, according to a switching policy preliminarily set by the user. Here, plural transfer-destination candidate terminals may be selected.

When a transfer-destination candidate terminal is determined, transfer-source terminal 100 performs the same process as in steps S103 through S116 in the first embodiment, acquires connectivity information after switching from the transfer-destination candidate terminal (steps S206 through S208), determines a transfer-destination terminal (step S209), and transfers the session (steps S210 through S218).

With these processes, the session having been established between transfer-source terminal 100 and communication-destination terminal 300 is transferred to a transfer-destination terminal determined by the transfer-destination terminal determinating unit for terminal switching. After that, nearby terminal 200b as a transfer-destination terminal establishes a session with communication-destination terminal 300 to start media exchange (step S219).

Here, total control unit 1206 of transfer-source terminal 100 may specify a terminal type and required function in a terminal information request issued by transfer-source terminal 100 for nearby terminal 200. In this case, if nearby terminal 200 has a terminal type different from that specified by the terminal information request, or does not support a required function specified by the terminal information request, the process is discontinued and the request is discarded. When the connectivity information request specifies a codec such as MPEG2 as a required function, for example, nearby terminal 200 that has received this request, if not supporting the specified codec, quits a process for the connectivity information request.

Here, the other operation and effects are the same as those in the first embodiment.

As described above, the terminal switching system according to the second embodiment determines a transfer-destination candidate terminal according to terminal information that transfer-source terminal 100 has acquired by searching for nearby terminal 200 using short-distance wireless and requests connectivity information after terminal switching only from the transfer-destination candidate terminal. Herewith, transfer-source terminal 100 can collect connectivity information only from a transfer-destination candidate terminal, thus reducing the amount of the communication process for collecting connectivity information, which allows switching to an appropriate terminal with a smaller amount of network communication traffic.

INDUSTRIAL APPLICABILITY

The present invention is useful for a communication terminal, particularly suitable for switching a communication terminal while the user continues the communication.

The invention claimed is:

1. A first user terminal that switches (a) an original communication session between the first user terminal and a second user terminal to (b) a subsequent communication session between the second user terminal and a third user terminal, the first user terminal comprising:
   a connectivity information unit that receives connectivity information from at least one candidate user terminal responsive to the at least one candidate user terminal attempting to establish a network connection with the second user terminal prior to the first user terminal switching to the subsequent communication session;
   a terminal determining unit that selects the third user terminal from among the at least one candidate user terminal, the third user terminal being selected when at least the connectivity information indicates that the network connection had been established between the second user terminal and the third user terminal prior to the first user terminal switching to the subsequent communication session, wherein the connectivity information indicates whether authentication with the third user terminal was successful; and
   a transferring unit that switches from (a) the original communication session between the first user terminal and the second user terminal to (b) the subsequent communication session between the second user terminal and the third user terminal.

2. The communication terminal of claim 1, wherein:
   the connectivity information unit acquires the connectivity information only from the at least one candidate user terminal, and
   the terminal determining unit determines the third user terminal from among the at least one candidate user terminal according to the connectivity information.

3. The first user terminal of claim 1, wherein the connectivity information unit further acquires server connectivity information that is an authentication possibility for the at least one candidate user terminal to establish a network connection with a server of the network.

4. The first user terminal of claim 1, wherein the connectivity information unit further collects server connectivity information that is an authentication possibility for the first user terminal to establish a network connection with a server of the network.

5. The first user terminal of claim 1, wherein the terminal determining unit selects the third user terminal responsive to having established a trial communication using dummy information and the temporary connection between the at least one candidate user terminal and the second user terminal prior to switching from the original communication session to the subsequent communication session.

6. A terminal switching system that switches (a) an original communication session established between a second user terminal and a first user terminal to (b) a subsequent communication session established between the second user terminal and a third user terminal, wherein
at least one candidate user terminal includes:
  a connectivity information unit that collects connectivity information indicating that at least a temporary network connection had been established between the at least one candidate user terminal and the second user terminal prior to the first user terminal switching to the subsequent communication session;
the first user terminal includes:
  a connectivity information unit that receives the connectivity information from the at least one candidate user terminal;
  a terminal determining unit that selects the third user terminal from among the at least one candidate user terminal according to at least the connectivity information, wherein the connectivity information indicates whether authentication with the third user terminal was successful; and
  a transferring unit that switches from (a) the original communication session between the second user terminal and the first user terminal to (b) the subsequent communication session between the second user terminal and the third user terminal.

7. The terminal switching system of claim 6, wherein the at least one candidate user terminal further includes:
  a terminal information unit that transmits, to the first user terminal, terminal information related to the at least one candidate user terminal, wherein
the connectivity information unit of the first user terminal acquires the connectivity information only from the at least one candidate user terminal, and the first user terminal determines the third user terminal from among the at least one candidate user terminal according to the connectivity information.

8. A terminal switching method in which a communication session established between a second user terminal and a first user terminal is switched from (a) the first user terminal and the second user terminal to (b) a third user terminal and the second user terminal, comprising:
  a step in which at least one candidate user terminal collects connectivity information indicating that at least a temporary network connection had been established between the at least one candidate user terminal and the second user terminal prior to the switching of the communication session to the second user terminal and the third user terminal, wherein the connectivity information indicates whether authentication with the third user terminal was successful;
  a step in which the at least one candidate user terminal transmits the connectivity information to the first user terminal;
  a step in which the first user terminal receives the connectivity information from the at least one candidate user terminal;
  a step in which the first user terminal determines a third user terminal from among the at least one candidate user terminal according to at least the connectivity information; and
  a step in which the first user terminal switches (a) the communication session between the first user terminal and the second user terminal to (b) the communication session between the second user terminal and the third user terminal.

9. The terminal switching method of claim 8, further comprising:
  a step in which the at least one candidate user terminal transmits, to the first user terminal, terminal capacity information that is unique information related to the at least one candidate user terminal; and
  a step in which the first user terminal requests connectivity information that is information for monitoring connectivity from the at least one candidate user terminal to the second user terminal.

10. The terminal switching method of claim 8, wherein the connectivity information includes at least any one of accessibility of a network between the at least one candidate user terminal and the second user terminal, transmission capacity of the network, and interconnectivity of a communication application.

\* \* \* \* \*